INVENTOR:
Delbert J. Ward
by LeRoy J. Leishman,
Agent.

June 26, 1956
D. J. WARD
2,752,568
APPARATUS FOR LOCATING THE NEUTRAL PLANE IN
GENERATORS AND MOTORS
Filed June 10, 1952
4 Sheets-Sheet 2
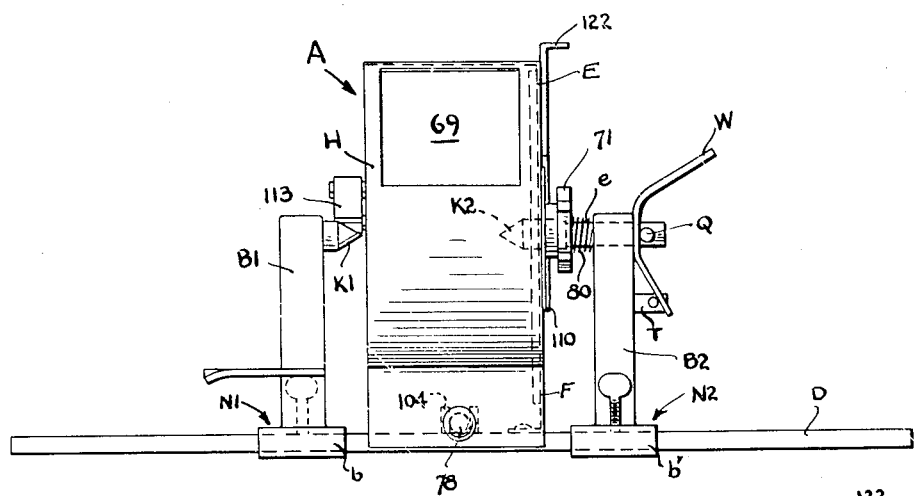
Fig. 2
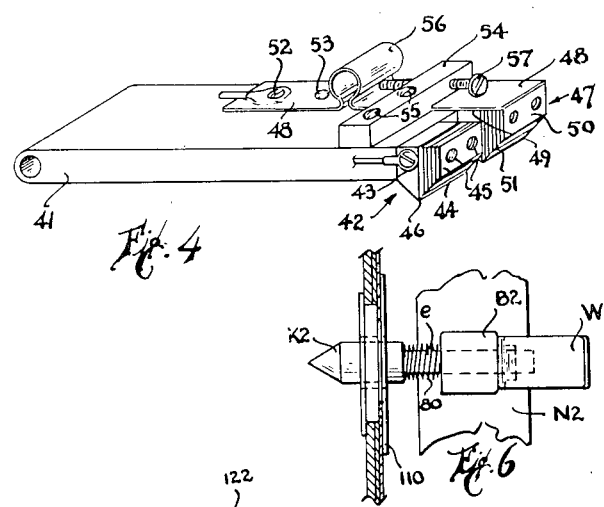
Fig. 4
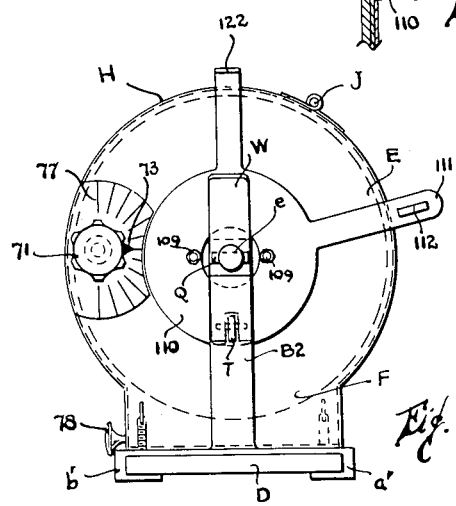
Fig. 3
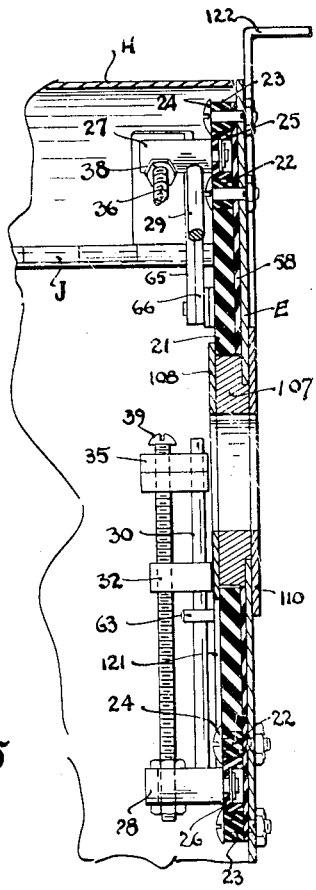
Fig. 6
Fig. 5
INVENTOR:
Delbert J. Ward
by LeRoy J. Leishman,
Agent

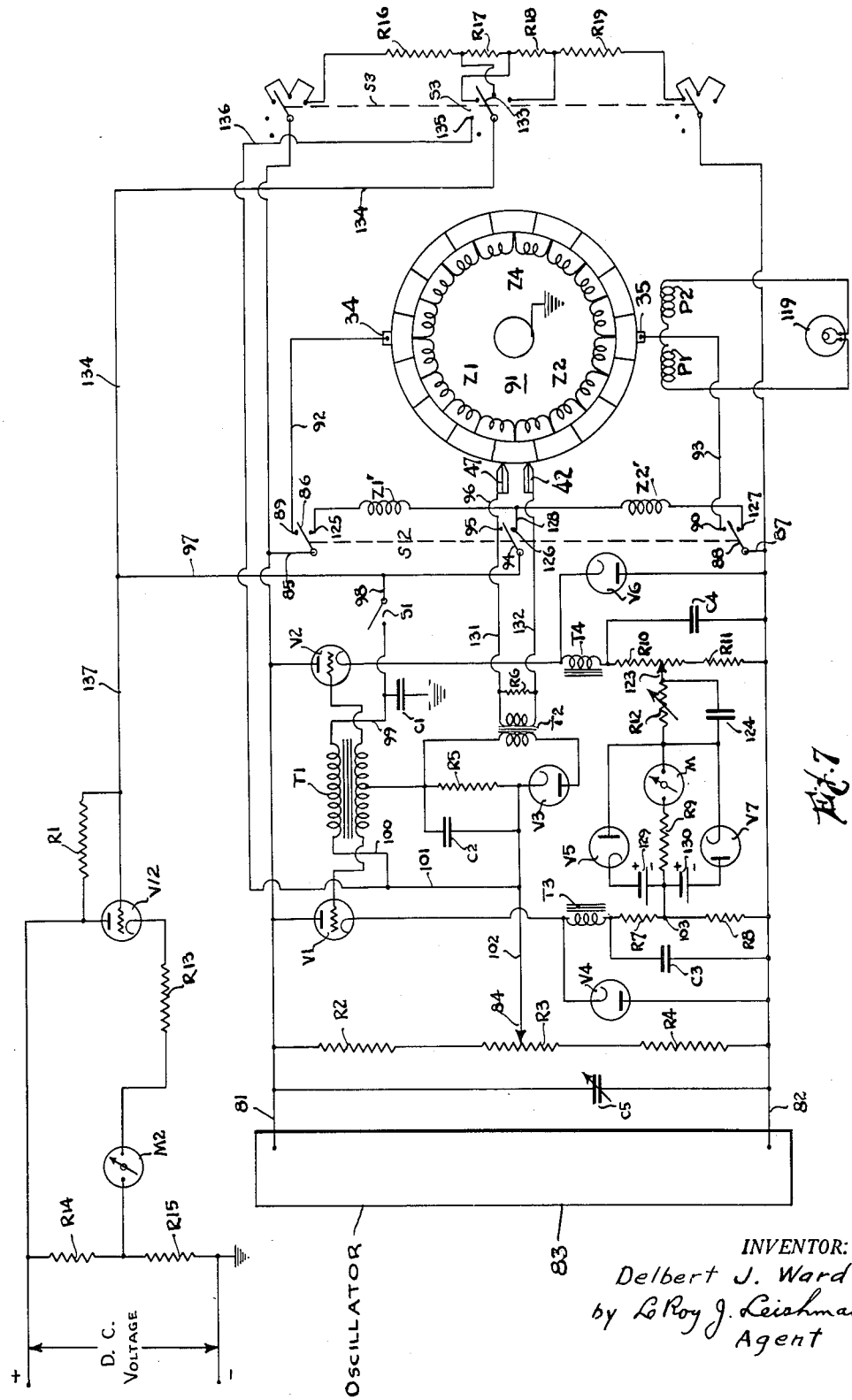

June 26, 1956　　　　　　D. J. WARD　　　　　　2,752,568
APPARATUS FOR LOCATING THE NEUTRAL PLANE IN
GENERATORS AND MOTORS
Filed June 10, 1952　　　　　　　　　　　　4 Sheets-Sheet 4

INVENTOR:
Delbert J. Ward
by LeRoy J. Leishman,
　　Agent

United States Patent Office 2,752,568
Patented June 26, 1956

2,752,568

APPARATUS FOR LOCATING THE NEUTRAL PLANE IN GENERATORS AND MOTORS

Delbert J. Ward, Los Angeles, Calif.

Application June 10, 1952, Serial No. 292,616

6 Claims. (Cl. 324—158)

This application is a division of my application Serial Number 628,194, filed November 13, 1945. The first patent issuing as a result of that application will issue as Patent No. 2,600,088 on June 10, 1952.

The invention herein described pertains to motor and generator testing equipment, and more particularly to mechanical and circuit arrangements for accurately locating the neutral plane in the armatures of such devices.

One object of the invention is to provide simple means for locating such plane or axis.

A further object is to provide means for measuring the angular position or variation of this plane with respect to at least one of the power brushes.

Other objects will appear as the specification proceeds.

In the drawings:

Fig. 2 is a front elevation of the jig.

Fig. 3 is a right side elevation of the jig shown in Fig. 2.

Fig. 4 is a detailed isometric drawing of two of the brushes used in the jig, and of their supporting means.

Fig. 5 is a cross-section taken on line 5—5 of Fig. 1.

Fig. 6 is a plan view that shows the mounting of one of the mandrels that hold the armatures in the jig.

Fig. 7 is a circuit diagram of an instrumentation network.

Figure 1:
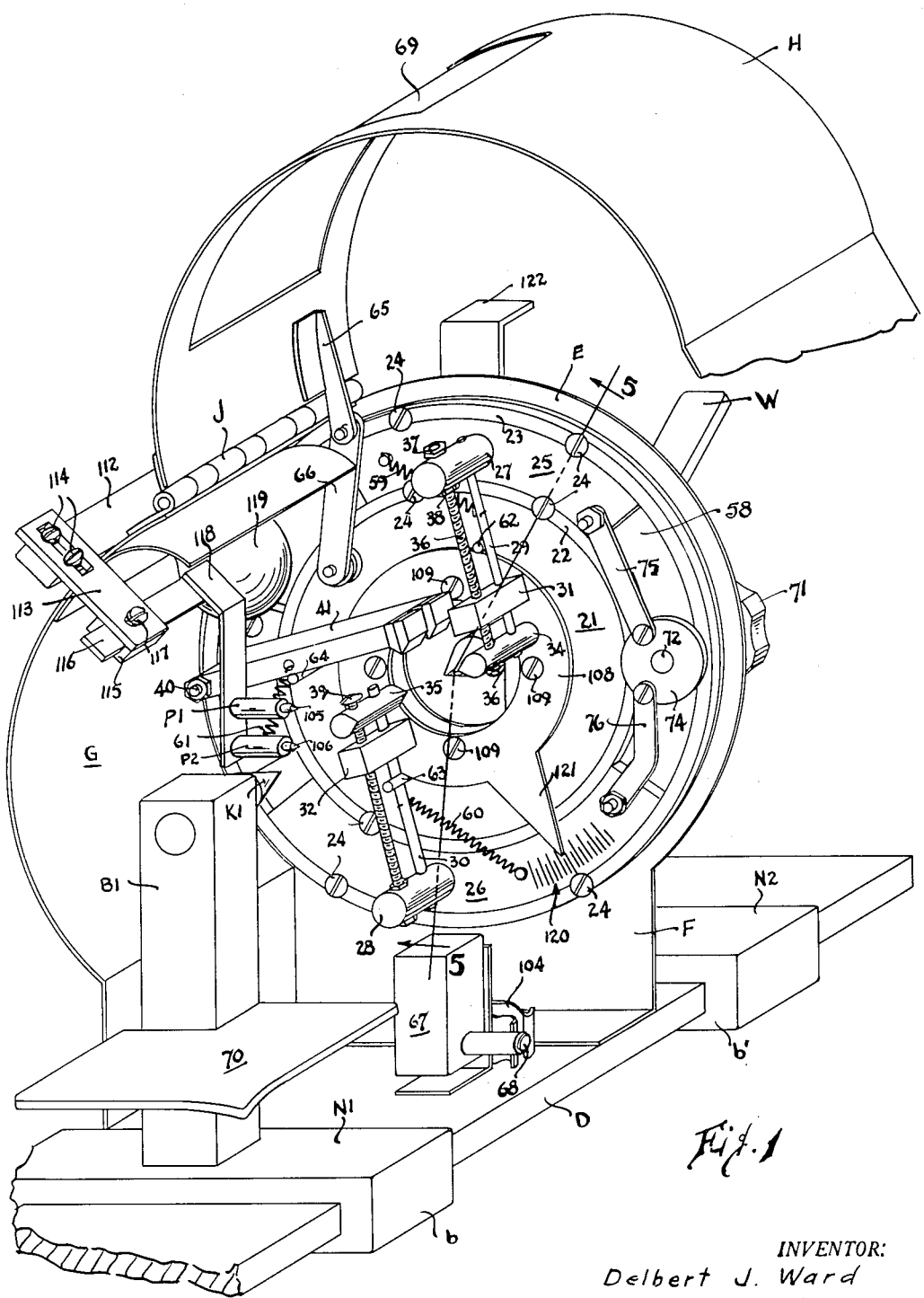
Fig. 1 is an isometric drawing of my jig in which motor armatures are placed for test.
Figure 8:
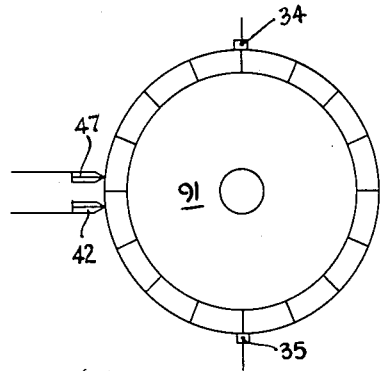
Fig. 8 is a diagram of a commutator oriented differently with respect to the brushes of my device than in Fig. 7.

As is well known by designers of motors and generators, proper operation requires that the brushes be correctly located with respect to the neutral plane of the armature. If armatures were always perfectly wound, and if the commutators were always perfectly positioned with respect to the windings, the brushes in factory-produced equipment would always energize the proper coils when at their correct angular positions with respect to the field windings; but errors in winding and angular misalignment of the commutator with respect to the coils frequently occur, with the result that the neutral plane is displaced from its proper theoretical position. When such displacement occurs, it is either necessary to correct the windings or to realign the commutator—depending, of course, on what proves to be wrong with the armature—or to discard the armature completely. In large motors or generators, it is frequently possible to correct for misalignment of the commutator with respect to the armature coils by shifting the brushes, but this can only be done if the angular displacement of the neutral plane is known.

If a variation of the neutral plane of a motor armature from its proper position is not detected, the motor will not produce the torque for which it is designed, the difficulty being analogous to that which develops in an internal combustion engine when the distributor or timer is out of adjustment. Furthermore, arcing between the brushes and commutator will occur, with the result that the commutator will soon be pitted and burned to a degree that will render it practically useless.

In some motors and generators, the neutral plane should be in line with the point of contact with the brushes. In motors and generators of other designs, the neutral plane should be displaced 90 degrees from the point of contact of the brushes. Other designs of motors and generators require still a different relationship between the neutral plane and points of contact of the brushes.

The present invention makes it possible to locate the neutral plane of an armature. If it is not correctly positioned, the armature may then be discarded or repaired by making suitable alterations, or the difficulty may be compensated for by shifting the brushes—all in accordance with information obtained by apparatus embodying my invention.

The armature in which the neutral plane is to be located must be mounted in a suitable jig, such, for example, as that described in my co-pending application Serial No. 292,430, filed herewith, June 9, 1952, now Patent No. 2,704,824, issued March 27, 1955, and shown in Figs. 1 to 6 hereof.

This jig comprises four main parts: a housing A that supports and encompasses the various brushes, two relatively movable members B1 and B2 that carry mandrels K1 and K2 respectively, and a base D.

The housing comprises a side member E of circular shape at the top and partially supported by an integral depending portion F attached to the base D. Member E has a central hole to permit one end of an armature to pass therethrough when the armature shaft is pivoted on mandrels K1 and K2. A back wall G extends straight up from the rear of the base as far as the circular portion of member E, and its upper part is curved to form a partial cylinder having substantially the same radius as the circular portion of the end member E. The back wall G is transverse to member E, and one edge of the curved portion is attached to the periphery of the circular part of the end piece E. A closure H, having the same radius of curvature as the curved portion of the back wall G, is attached to the upper end of the back wall by hinge J. The free end of the closure is straightened to conform to the outlines of the lower portion F, of member E, and it carries an operating knob 78, Fig. 2. When the closure member is in its closed position, a ball attached to the inside thereof behind knob 78 is yieldingly held by the resilient detent 104, attached at its center back-portion to the base D.

The mandrel-carrying member B1 is mounted on a carriage N1, which carries two L-shaped pieces a and b that extend around and under the base to serve as ways when the carriage is moved longitudinally of the base. The mandrel-carrying member B2 is similarly mounted on a carriage N2 having two similar L-shaped ways, the forward one of which, b', may be seen in Fig. 1. Mandrel K1, adapted to hold the end of a motor armature that is furthest from the commutator, is pressed or otherwise firmly attached to the mandrel-carrying member B1. Mandrel K2 has a reduced shank e that is slidably mounted in the mandrel-support B2. Between the support B2 and the shoulder d, the shank e of mandrel K2 is surrounded by a compression spring 80 to urge this mandrel toward the other. A pin Q extends through the shank e on the side of support B2 opposite from spring 80. An operating handle W, curved substantially as shown, is slotted intermediate its ends to straddle the portion of shank e that lies between pin Q and the mandrel support B2. The lower end of handle W is pivoted on post T, rigidly attached to support B2.

A centrally apertured disc 58, formed of insulating material, is mounted on the inside of end wall E. Two concentric insulating rings 22 and 23 are attached to discs E and 58 by means of screws 24, the heads of which overhang the respective strips in which they are placed. These arcuate strips and screw heads together form ways for slidably mounting two arcuate insulating supports 25 and 26 on opposite sides of the center holes in discs E and 58. Two posts, 27 and 28, are rotatably mounted on arcuate supports 25 and 26 respectively. One end of a bar 29 is rigidly attached to post 27, and another bar 30 is similarly anchored to post 28. Blocks 31 and 32, disposed intermediate the ends of bars 29 and 30 respectively, are integral with these bars. The tapered brush 34 has two holes therein, one of which is threaded. The untapped hole is adapted to receive the free end of bar 29. An adjusting screw 36 is threaded through the other hole in brush 34 and then through a clearance hole in block 31. The end of screw 36 passes through a hole in post 27 that is large enough to clear the threads of the adjusting screw. Nuts 37 and 38, soldered or welded to screw 36, are disposed on opposite sides of post 27 so that the screw is restrained against longitudinal movement while turning. Brush 35 is mounted in the same manner as brush 34, and has an adjusting screw 39 in threaded engagement with the brush, the end of screw 39 being rotatably supported in post 28. Block 32 has a clearance hole therein to assist in holding the screw in place.

A third post 40 is mounted directly on the insulating disc 58. On this post is pivoted an arm 41 (shown in some detail in Fig. 4) made of Bakelite or other appropriate insulating material. Brush 42 is directly mounted on the end of arm 41 by means of screws 45. Brush 42 is composed of a conducting half 43 and a non-conducting half 44, both terminating in a single knife edge 46 to prevent the shorting of adjoining commutator bars when in engagement therewith. Another identical brush 47 is attached to a spring member 48, the conducting half 49 being soldered or welded to the spring member and the non-conducting half 50 being screwed to the conducting or metal portion 49. The opposite end of spring 48 is attached to the non-conducting arm 41 by means of screws 52 and 53. Between these screws and brush 47, the spring is provided with a bend or loop substantially as shown in Fig. 4. A block 54, attached by screws 55, extends transversely across arm 41 between the loop 56 and the brushes, the portion above the spring 48 being cut away to permit the free end of the spring to flex as well as to move longitudinally as far back as the loop. An adjusting screw 57 is threaded through block 54 so that the end opposite the screw head bears against the spring. The tendency of loop 56 to expand causes brush 47 to move outwardly whenever screw 57 is loosened; but when it is turned so that it moves longitudinally toward the loop, the brush is caused to move back. Screw 57 thus permits brush 47 to be moved relative to brush 42.

Springs 59, 60 and 61, attached to arms 29, 30 and 41 respectively, are appropriately anchored at their other ends to the non-conducting members 25, 26 and 58 respectively. These springs serve to yieldingly hold the brushes in contact with the commutator of the armature when it is pivoted between mandrels P1 and P2.

Posts 62, 63 and 64, mounted on the rotatable non-conducting disc 21, serve to engage arms 29, 30 and 41 respectively and move the brushes away from the commutator as the closure H is raised. This is effected through clockwise rotation of disc 21 to which one end of link 66 is pivoted, the other end of this link being pivoted to bracket 65 attached to the closure H. Whenever the lid is raised, the brushes are thus out of the way, permitting armatures to be placed in the jig and removed without interference.

An armature is placed in the jig in the following manner: First, the operator must make sure that the mandrel-carrying supports B1 and B2 are positioned so that the commutator is disposed in proper relationship to the brushes and so that the distance between the ends of the mandrels K1 and K2 is slightly less than the length of the armature shaft. If the mandrels are not already suitably positioned, they may be moved and repositioned. This is done by releasing set-screws which normally bear upon the base D and tighten the lower flanges of members $a$, $a'$, $b$ and $b'$ against the under side of the base. When these screws are loosened, the carriages N1 and N2 may be moved lengthwise of the base, thus permitting the mandrels to be re-positioned and spaced according to the requirements just mentioned. The tightening of the set-screw in carriages N1 and N2 will anchor the carriages in the new positions to which they have been adjusted. It will be assumed for the present that the coils P1 and P2 and their associated structure (later to be described in connection with the circuits) are far enough back to be out of the way of the armature that is to be placed in the jig. While the closure H is in its raised position, the handle W is moved to the right, causing it to bear upon pin Q, thus moving mandrel K2 to the right against the action of spring 80. The armature may then be placed between the mandrels with the centers of the two ends of the armature shaft in engagement with the mandrel points. Upon releasing handle W, spring 80 will urge mandrel K2 toward the left, thus holding the shaft in proper alignment between the two mandrels.

When the closure is lowered, disc 21 turns counter-clockwise, permitting the brushes to move inwardly until they come into contact with the commutator of the armature.

A switch 67, attached to base D, opens and closes one of the circuits (later to be described) that indirectly supplies power to the brushes. Inasmuch as this switch is normally open, the current is always off when the closure H is raised. When the closure is lowered, it engages operating member 68 of switch 67, thus energizing the brushes. In the closed position, the lid H protects the operator from the high voltages, but he nevertheless has easy access to the end of the armature nearest to post B1, to which is attached a support 70 on which he may rest his left hand while slowly turning the armature in order properly to conduct the tests later to be described; and he may watch what he is doing through the window 69 in the closure.

Knob 71, carrying an indicator 73, Fig. 3, is keyed to shaft 72, on the other end of which is mounted a disc, or double eccentric, 74. Two links, 75 and 76, are pivoted to this disc at points displaced from the center, and the opposite ends of these links are pivoted respectively to the arcuate members 25 and 26. It will be observed that this mechanism, upon rotation of knob 71, moves brushes 34 and 35 both closer to, or further from, the brushes carried by arm 41. This adjusts the brushes 34 and 35 so that they will be properly positioned for the number of segments in the commutator of the particular armature under test, as indicated on scale 77 with which the pointer 73 cooperates. The nature of the adjustment thus made will be more fully discussed in connection with the circuits.

The jig is connected to an instrumentation network, one form of which is illustrated in Fig. 7. I obtain the voltages to operate the system from a 4000 cycle oscillator and power amplifier having a conventional power supply. This alternating current source 83 is indicated in the left portion of the figure. Conductors 81 and 82 are connected to this current source. When switch S2 is turned so that its rotary contacts 86, 94 and 88 respectively engage the stationary contacts 89, 95 and 90, current from the conductors 81 and 82 energize the coils of the armature through brushes 34 and 35, as shown in Fig. 7. The connection from conductor 81 to brush 34 is then through conductor 85, blade or wiper 86, contact 89 and wire 92; and the connection from conductor 82 to brush 35 is through conductor 87, blade 88, stationary contact 90 and wire 93.

The coils P1 and P2, Figs. 1 and 7, which locate the neutral plane of an armature, are disposed on opposite sides of the power brush 35, and may be adjusted by means of the structure shown in Figs. 1, 2, 3 and 5, so that the points of their cores 105 and 106 come into close proximity with the armature core. If desired, only one such coil and core may be used, in which case the core is aligned with the power brush so that opposite halves of the coil lie on opposite sides of the center, or axis, of the brush. Inasmuch as such armature cores are of various diameters and vary in their distances from the commutator, provisions must be made for adjusting the single or paired coils P1 and P2 radially (that is, toward or from the main axis of the jig) as well as longitudinally. Other purposes, later to be explained, require that such coil or coils also be angularly adjustable. The structure that makes the radial, longitudinal and angular adjustments possible will now be explained. For the purposes of such explanation, it will be assumed that there are two coils.

A short cylindrical member 107, rotatably mounted in the central holes in members E and 58, has a flange 108 attached to the end inside the jig by screws 109. A relatively large flat ring 110 is similarly affixed to the opposite end of member 107. A radial projection 111, Fig. 3, integral with ring 110, carries an axially extending bar 112. A slotted member 113, Fig. 1, is transversely mounted on bar 112 in such a manner that it may be moved radially and fixed in adjusted position by means of screws 114. A block 115 is rigidly attached to the under side of the lower end of member 113. This block is slotted to receive an axially movable bar 116, and a set screw 117 serves to hold bar 116 in adjusted position. A bracket 118 is welded or otherwise rigidly attached to bar 116. This bracket 118 carries the two coils P1 and P2 with their pointed pole pieces 105 and 106. These coils and pole pieces may be moved axially along the armature by the longitudinal adjustment of member 116, and they may be adjusted toward or away from the armature by means of bar 113 and the screws 114.

Inasmuch as the current in the armature coils on opposite sides of brush 35 flows in opposite directions, the magnetic flux cutting coils P1 and P2 will also be in opposite directions and will therefore generate opposing currents in these coils. If the flux is equal through both coils, the opposing currents will neutralize each other, with the result that lamp 119 will not light. The same theory applies when only one coil and core is used. If the flux is equal in opposite halves of the coil, the resulting currents in these two halves will also be in opposite directions and will likewise neutralize each other. When the turns of wire are so adjusted with respect to the armature that the lamp does not light, the neutral plane of the armature passes midway between the coils, turns, or half turns, as the case may be. If the armature has the proper symmetry and the armature coils are properly wound, the neutral plane will pass through the power brush 35. The location of the neutral plane should therefore be determined with respect to this power brush, and consequently either the calibrated scale or the indicator for showing such location must be carried by, or movable with, the arcuate segment on which the power brush is supported—that is, segment 26. In practice, I place the calibrated scale 120 on this segment and make the pointer 121 integral with flange 108. The scale is so calibrated that when points 105 and 106 are equally distant from power brush 35, the pointer will be on zero. If the lamp 119 lights when the pointer is so positioned, the neutral plane is not in a symmetrical position. The actual position of the neutral plane may then be located by moving handle 122, attached to member 110, either clockwise or counter-clockwise, until the lamp goes out. The pointer 121 will then indicate on scale 120 the angular displacement of the neutral plane either to the right or left of a symmetrical position.

Figure 9:
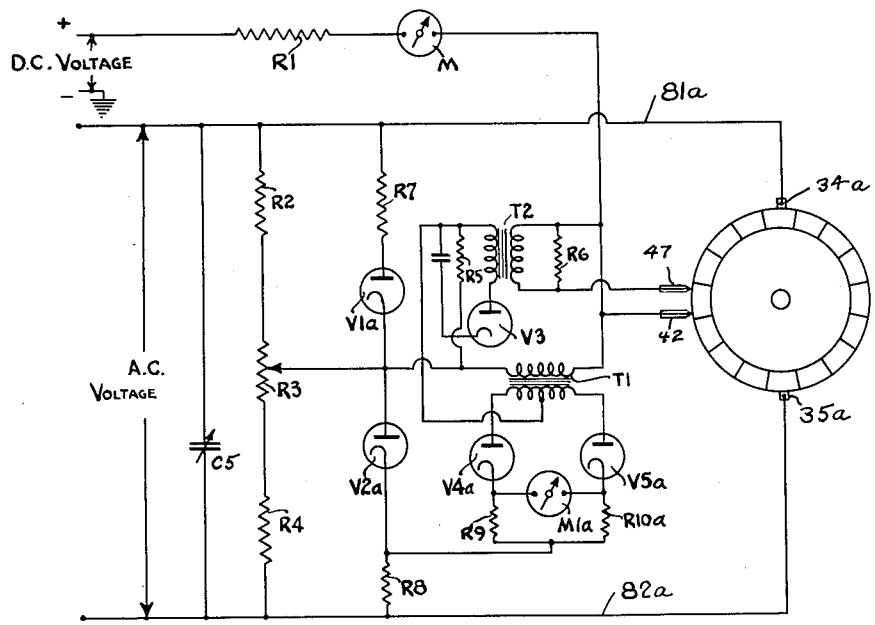
Fig. 9 is a diagram of an alternative circuit that may be used in connection with my mechanical device for locating the neutral plane.

Fig. 9 shows a modified circuit suitable for use with my jig. In this arrangement, the switch S2 of Fig. 7 is eliminated, and the power brushes are connected directly to the conductors leading from the current source. The conductors 81a and 82a of Fig. 9 correspond respectively to conductors 81 and 82 of Fig. 7, and it will be noted that they are connected directly to the power brushes 34a and 35a. The inductive halves P1 and P2 of the wire turns and the associated lamp 119, shown in Fig. 7, for locating the neutral plane, have been omitted from Fig. 9, but it will be understood that the arrangement of these elements with respect to the power brush will be the same regardless of which instrumentation network is used with the jig.

Various modifications, substitutions, omissions and additions may of course be made from the illustrative embodiment of my invention hereinbefore described, without departing from its broad spirit and nature as set forth in the appended claims.

My claims are:

1. In a device for locating the neutral plane of an armature, a combination including: a pair of brushes for contacting the commutator of said armature; a coiled conductive means rotatable around said armature within the field of the armature coils; means for detecting an induced current in said conductive means when the armature coils are energized by alternating current from said brushes; and calibrated means for indicating the relative angular position of said conductive means with respect to the angular position of at least one of said brushes.

2. In a device for locating the neutral plane of an armature, a combination including: means for holding the armature being tested; a pair of brushes for contacting the commutator of said armature; a coiled conductive means mounted for rotation around said armature within the field of the armature coils; means for detecting an induced current in said conductive means when the armature coils are energized by alternating current from the said brushes; and calibrated means for indicating the relative angular position of said conductive means with respect to the angular position of at least one of said brushes.

3. In a device for locating the neutral plane of an armature, a combination including: means for holding the armature being tested; a pair of brushes for contacting the commutator of said armature; a pair of electrical coils mounted for rotation around said armature within the field of the armature coils; means for comparing the current induced in said pair of coils when the armature coils are energized by alternating current from said brushes; and calibrated means for indicating the relative angular position of said pair of coils with respect to the angular position of at least one of said brushes.

4. In a device for locating the neutral plane of an armature, a combination including: means for holding the armature being tested; a pair of brushes for contacting the commutator of said armature; a first member reciprocably movable with respect to the coils of said armature in a first direction; a second member carried by said first member and reciprocably movable with respect to said armature coils in a direction transverse to the direction of movement of said first member; a coiled conductive means mounted on said second member; means for rotating said members and said conductive means as a unit around the axis of said armature; and means for detecting an induced current in said conductive means when the armature coils are energized by alternating current from said brushes.

5. In a device for locating the neutral plane of an armature, a combination including: means for holding the armature being tested; a pair of brushes for contacting the commutator of said armature; a first member reciprocably movable with respect to the coils of said armature in a first direction; a second member carried by said first member and reciprocably movable with respect to said armature coils in a direction transverse to the direction of movement of said first member; a coiled conductive means mounted on said second member; means for rotating said members and said conductive means as a unit around the axis of said armature; means for detecting an induced current in said conductive means when the armature coils are energized by alternating current from said brushes; and calibrated means for indicating the relative angular position of said conductive means with respect to the angular position of at least one of said brushes.

6. In a device for locating the neutral plane of an armature, a combination including: means for holding the armature being tested; a pair of brushes for contacting the commutator of said armature; a support mounted for rotation around the axis of said armature; a first member adjustably mounted on said support for translational movement in a first direction; a second member mounted on said first member for translational movement in a direction transverse to the direction of movement of said first member; a coiled conductive means mounted on said second member; means for detecting an induced current in said conductive means when the armature coils are energized by alternating current from said brushes; and indexing means comprising a stationary element and a rotatable element attached to said support for rotation therewith, one of said elements bearing a calibrated scale and the other of said elements comprising an indicator cooperating with said scale to indicate the angular position of the conductive means.

References Cited in the file of this patent
UNITED STATES PATENTS

| | | |
|---|---|---|
| 363,129 | Easton | May 17, 1887 |
| 2,529,529 | Zemansky | Nov. 14, 1950 |